(12) United States Patent
Minne'

(10) Patent No.: US 6,762,930 B2
(45) Date of Patent: Jul. 13, 2004

(54) FORM FACTOR CARD WITH STATUS INDICATOR

(75) Inventor: Mark W. Minne', Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/051,571

(22) Filed: Jan. 17, 2002

(65) Prior Publication Data

US 2003/0133262 A1 Jul. 17, 2003

(51) Int. Cl.[7] .................................................. G06F 1/16
(52) U.S. Cl. ...................... 361/683; 361/737; 361/753; 174/335 GC; 340/825.44
(58) Field of Search .......................... 361/681–689, 361/728, 736, 737, 801, 785; 439/490, 676, 76.1, 910, 946, 945, 630, 159; 235/441, 475, 382, 459, 375, 380; G06K 19/07

(56) References Cited

U.S. PATENT DOCUMENTS

| | | |
|---|---|---|
| 5,345,367 A | 9/1994 | Pierce et al. |
| 5,375,222 A | 12/1994 | Robinson et al. |
| 5,379,401 A | 1/1995 | Robinson et al. |
| 5,388,248 A | 2/1995 | Robinson et al. |
| 5,428,566 A | 6/1995 | Robinson |
| 5,696,970 A | 12/1997 | Sandage et al. |
| 5,864,661 A | 1/1999 | Ohara |
| 5,938,750 A | 8/1999 | Shaberman |
| D416,866 S | 11/1999 | Amin |
| 6,095,851 A * | 8/2000 | Laity et al. ................. 439/490 |
| 6,126,070 A | 10/2000 | Fukuzumi |
| D446,525 S | 8/2001 | Okamoto et al. |
| 6,295,031 B1 * | 9/2001 | Wallace et al. ............. 343/702 |
| 6,295,139 B1 | 9/2001 | Yamauchi et al. |
| 6,547,135 B2 * | 4/2003 | Solirenne et al. ........... 235/382 |
| 6,561,851 B2 * | 5/2003 | Florescu ..................... 439/630 |
| 2001/0025310 A1 | 9/2001 | Krishnamurthy et al. ... 709/223 |

FOREIGN PATENT DOCUMENTS

| | | | | |
|---|---|---|---|---|
| EP | 000302453 A1 * | 2/1989 | .......... | G06K/19/07 |
| JP | 404205081 A * | 7/1992 | .......... | G06K/19/07 |
| JP | 405242315 A * | 9/1993 | .......... | G06K/19/07 |
| JP | 02001266098 A * | 9/2001 | .......... | G06K/19/07 |
| WO | WO 99/02002 | 1/1999 | | |

OTHER PUBLICATIONS

Almesberger, Werner; Ferrari, Tiziana; and Le Boudeo, Jean-Yves; "SRP: a Scalable Resource Reservation Protocol for the Internet"; IEEE, 1998; pp. 108–116.

Feng, Wu-Chang; Kandlur, Dilip; "Adaptive Packet Marking for Maintaining End-to-End Throughput in a Differentiated-Services Internet"; IEEE, ACM Transactions on Networking vol. 7, No. 5, Oct. 1999; pp. 685–697.

Braden, R.; Zhang, L.; Berson, S.; Herzog, S.; Jamin, S.; "Resource ReSerVation Protocol (RSVP)"; Braden, Ed., et al.; Sep. 1997; pp. 1–31; XP-002204209.

ISR PCT/EP 02/01856; Dated Jul. 8, 2002.

* cited by examiner

Primary Examiner—Michael Datskovskiy

(57) ABSTRACT

A form factor card compatible for use with a host electronic device that is capable of communicating a status of the form factor card to a user of the host electronic device. The form factor card comprises an adapter region for interfacing the card with the host electronic device, an on-card electronic device for performing a task for the host electronic device, an on-card intelligent controller, and an indicator in communication with the on-card intelligent controller to communicate an operational status of the form factor card.

20 Claims, 6 Drawing Sheets

FORM FACTOR CARD WITH STATUS INDICATOR

THE FIELD OF THE INVENTION

The present invention relates generally to form factor cards, and more particularly, to a form factor card having a status indicator.

BACKGROUND OF THE INVENTION

With the proliferation of portable electronic devices, such as digital cameras, personal digital assistants, and notebook computers, the use of form factor cards adapted for use with these devices is steadily increasing. The term "form factor card" is a general term often used to describe a memory card, such as a SONY memory stick or CompactFlash card, but also applies to cards that perform other functions, including I/O cards such as serial cards, Ethernet cards, fax/modem cards, wireless pagers, and multimedia cards.

An unfortunate characteristic of form factor cards, particularly memory cards, is their tendency to operate at relatively slow speeds. Furthermore, form factor cards do not have a means to indicate when the cards are being accessed by a host electronic device. The combination of slow operating speed and no indicating means can lead to potential problems. A user of an electronic device employing a form factor card, for instance, might inadvertently remove the card from the host device before the host device has completed accessing the card resulting in loss of data or worse. Prematurely removing a memory card from a digital camera before the camera has completed writing or reading data from the card, for example, can corrupt the file being written or may cause an application to "hang" when reading the file.

Users of electronic devices employing form factor cards would benefit from a form factor card able to communicate to the user various statuses of the card such as when it is being accessed, failure modes, and other card functions.

SUMMARY OF THE INVENTION

The present invention provides a form factor card compatible for use with a host electronic device that is capable of communicating a status of the form factor card to a user of the host electronic device. The form factor card comprises an adapter region for mechanically and electrically interfacing the card with the host electronic device, an on-card electronic device for performing a task for the host electronic device, an on-card intelligent controller, and an indicator in communication with the on-card intelligent controller to communicate an operational status of the form factor card.

DESCRIPTION OF THE PREFERRED EMBODIMENTS

In the following detailed description of the preferred embodiments, reference is made to the accompanying drawings that form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the claims.

Figure 1:
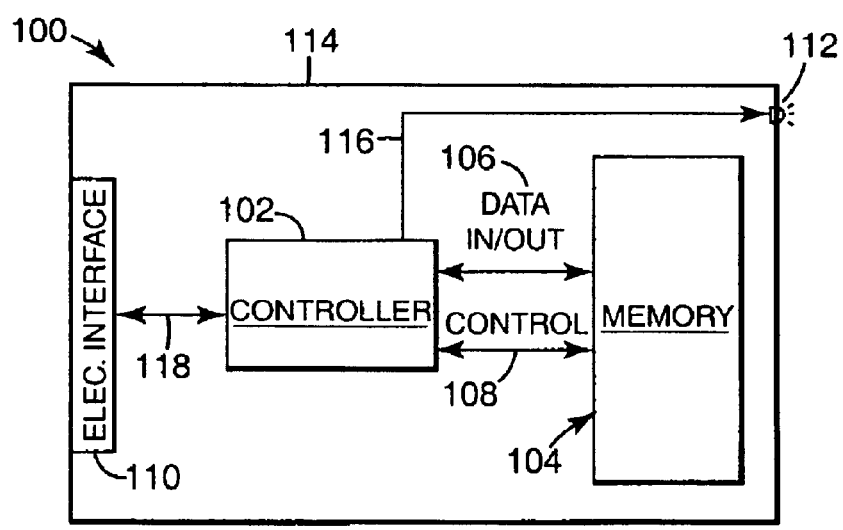
FIG. 1 is a block diagram illustrating one exemplary embodiment of a form factor card having a status indicator according to the present invention.

One embodiment of a form factor card according to the present invention is illustrated generally in block diagram form at 100 in FIG. 1. Form factor card 100 includes an on-board intelligent controller 102, a memory device 104 having a plurality of memory modules, data channels 106, control channels 108, an electrical interface 110 for connection to an electronic host device, a status indicator 112 (e.g., a viewable or audible device) and a housing 114. In one embodiment, form factor card 100 is a CompactFlash storage card meeting the CFt and CompactFlash Specification of the CompactFlash Association (www.compactflashorg). The CFt and CompactFlash Specification is herein incorporated by reference. On-board intelligent controller 102 controls the status of status indicator 112 via a link 116 and communicates with an electronic host device via interface 110 and interface channels 118. On-board intelligent controller 102 also manages interface protocols with a host electronic device, data storage and retrieval, diagnostics, defect handling, error correcting, and power management and clock control functions. In one embodiment, on-board intelligent controller 102 is a microprocessor. Memory device 104 can be embodied in a plurality of forms, including, but not limited to, flash memory and magnetic random access memory (MRAM). In the exemplary embodiments described herein, status indicator 112 includes a visual indicator such as an indicating light and hereafter will be referred to as indicating light 112. Indicating light 112 can have several embodiments including, but not limited to, a filament-type lamp or a light emitting diode. Indicating light 112 can also be of myriad colors (e.g., red, green and yellow). Alternatively, another type of status indicator may be used (e.g., sound indicator via an on-card speaker system). Other suitable status indicators will become apparent to one skilled in the art often reading the present application.

Figure 2A:
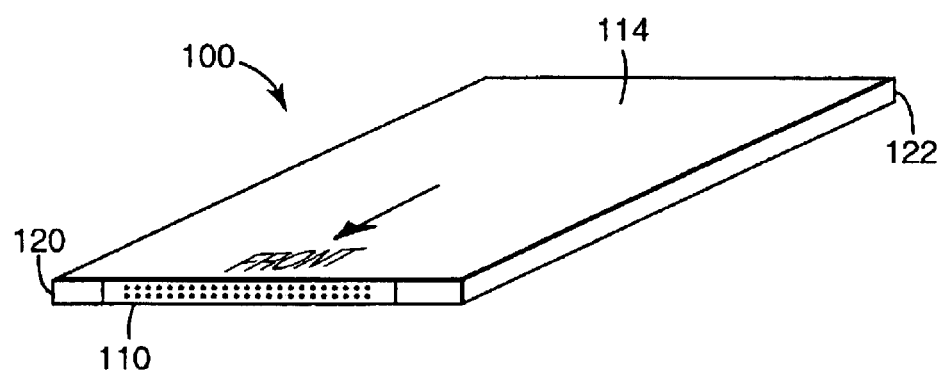
FIG. 2A is a perspective view of one exemplary embodiment of a form factor card having a status indicator according to the present invention.
Figure 2B:
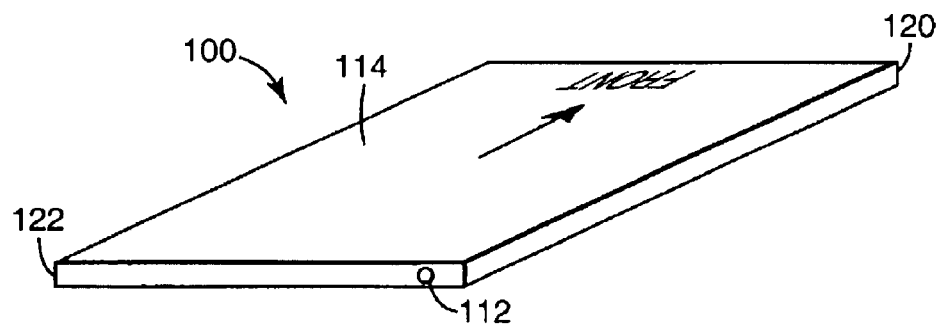
FIG. 2B is another perspective view of one exemplary embodiment of a form factor card having a status indicator according to the present invention.

FIGS. 2A and 2B are perspective views of one general embodiment of form factor card 100 illustrated by FIG. 1. FIG. 2A is a front perspective of form factor card 100 and illustrates housing 114, including a leading edge 120 and a trailing edge 122. Front edge 120 further includes electrical and mechanical interface 110. Electrical interface 110, as illustrated in FIG. 2A, comprises an array of female connectors, but can take the form of a plurality of embodiments, including but not limited to an array of male pin-connectors.

FIG. 2B is a rear perspective of form factor card 100 and again illustrates outer body 114, leading edge 120, and trailing edge 122. Form factor card 100 further includes indicating light 112 at trailing edge 122. While indicating light 112 is illustrated by FIG. 2B as being located at trailing edge 122, indicating light 112 can be located anywhere where the light will be visible to a user of a host electronic device. Also, while FIG. 2B illustrates indicating light 112 as being located at and extending above trailing edge 122, indicating light 112 can be located anywhere where the light is visible to a user and can be mounted in myriad fashions including, but not limited to, recess, surface, or flush-mounted. Additionally, while indicating light 112 is shown in FIG. 2B as being spherical in shape, it can be of substantially any shape (e.g., an oval or square shape).

Figure 3A:
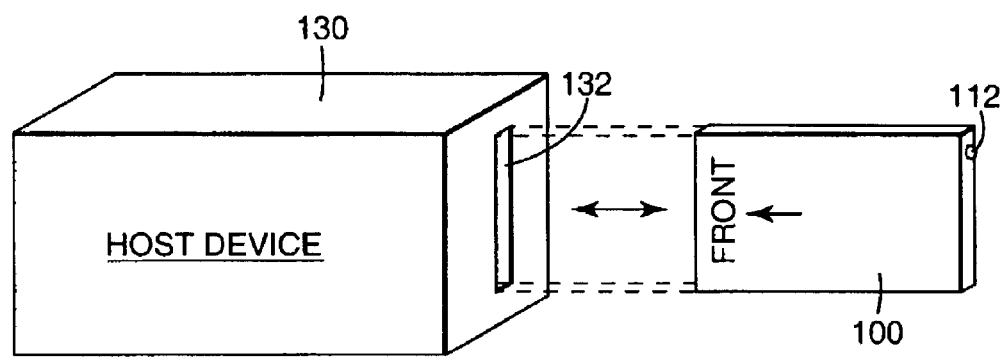
FIG. 3A illustrates one relationship between an uninstalled form factor card according to the present invention and a host electronic device.
Figure 3B:
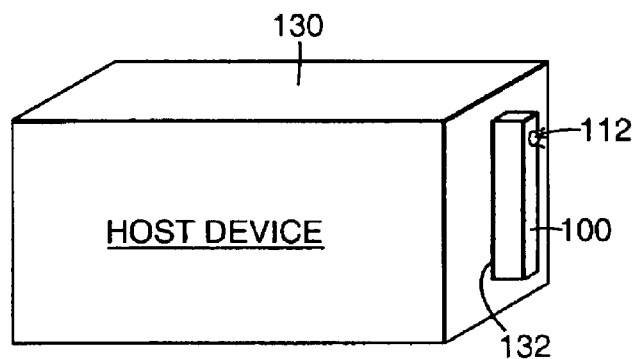
FIG. 3B illustrates one embodiment of a form factor card according to the present invention installed in a host electronic device.

FIGS. 3A and 3B are perspective views illustrating the relationship between form factor card 100 and a host electronic device 130. Host device 130 can be any device utilizing a form factor card including, but not limited to, digital cameras, digital camcorders, personal digital assistants, laptops, and notebook computers on other mobile computing devices. FIG. 3A depicts form factor card 100 in an uninstalled position and shows the relationship between form fact card 100 and a host slot 132. FIG. 3B depicts form factor card 100 in an installed position, after form factor card 100 has been slideably inserted into host slot 132 and engaged by host device 130.

Figure 4:
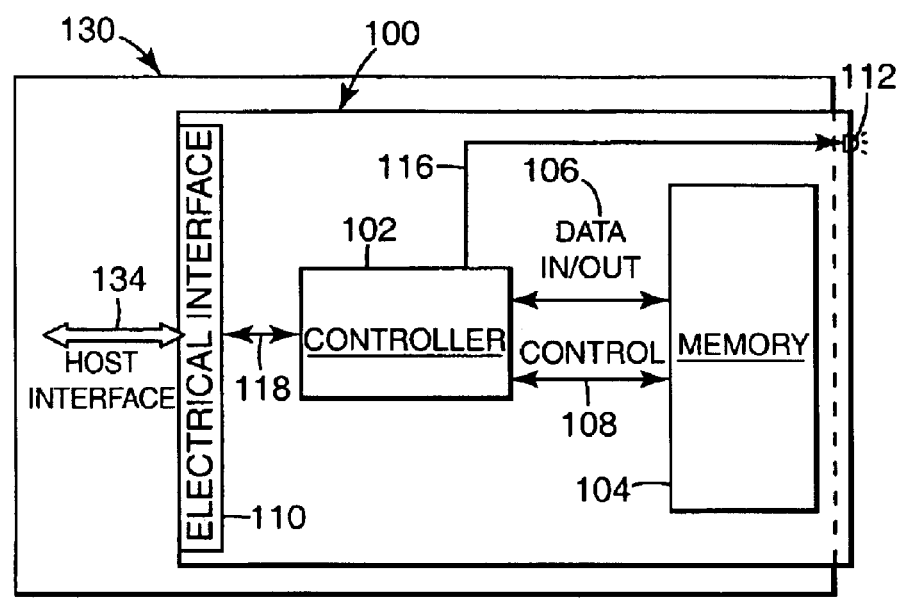
FIG. 4 is a block diagram illustrating one exemplary embodiment of a form factor card according to the present invention installed within a host electronic device.

FIG. 4 is a block diagram illustrating form factor card 100 of FIG. 1 in an installed position within host device 130, with host interface channels 134 engaged with electrical interface 110. Interface channels (i.e. bus) 134 transfer data between host device 130 and form factor card 100 and provides electrical power to form factor card 100 via electrical interface 110 and interface channels 118. On-board intelligent controller 102 manages interface protocols with host device 130, data storage and retrieval functions, error-correcting functions, defect handling and diagnostic functions, and power management and clock control functions. On-board controller 112 also controls the on/off status of indicating light 112 via line 116 to thereby indicate a status of form factor card 100 to a user of host electronic device 130.

Form factor card 100 is capable of communicating a plurality of statuses of the form factor card to a user of host device 130. In one embodiment, form factor card 100 utilizes a green indicating light 112 to communicate to the user that the card is properly installed and ready for operation. In the uninstalled position, indicating light 112 is not illuminated. However, after form factor 100 is slideably inserted into host device 130 and all connections are properly made between electrical interface 110 and host device 130, controller 102 illuminates indicating light 112, thereby informing the user that the card is ready for use. If form factor card 100 is not properly seated within host device 130, indicating light 112 is not illuminated, thereby informing the user that the card is not properly installed.

In one embodiment, controller 102 monitors for activity data channels 106 and interface channels 118, and utilizes a red indicating light to communicate to the user whether the card is currently being accessed by electronic host device 130. When controller 102 detects no activity on channel 106 or 118, indicating light 112 is not illuminated, thereby informing the user that form factor card 100 is not being accessed by host device 130 and that it is safe to remove the card from the host device is so desired. When controller 102 detects activity on channel 106 or 118, controller 112 illuminates indicating light 112, thereby informing the user that form factor card 100 is being accessed by host device 130 and should not be removed. Controller 102 illuminates indicating light 112 continuously or flashes it on and off.

In one embodiment, controller 102 monitors the amount of memory being used in memory device 104. When the amount of memory being used reaches a predetermined threshold, form factor card 100 utilizes a yellow indicating light to communicate to the user that memory device 104 is nearing its maximum capacity. When the memory threshold is reached, controller 102 illuminates yellow indicating light 112 continuously or flashes it on and off, thereby informing the user that memory device 104 is nearing capacity.

In one embodiment, controller 102 monitors the amount of memory being used in memory device 104. When memory device 104 has not reached its full capacity, indicating light 112 is not illuminated. When memory device 104 has reached full capacity, controller 102 illuminates red indicating light 112 to thereby indicate to a user that memory device 104 is full and that form factor card 100 should be replaced with a card having memory capacity prior to performing additional functions with host device 130. Controller 102 illuminates indicating light 112 continuously or flashes it on and off.

In one embodiment, a user of host electronic device 130 can disable the status indicating light 112. When host electronic device 130 is not connected to line power, but is operating on battery power, the user can selectively disable the indicating lights to reduce the power consumed by form factor card 100, thereby extending the life of the battery. The indicating lights could be disabled by a manual switch that is integral to form factor card 100 or could be disabled using a code transmitted to controller 102 from host electronic device 130 via interface channels 134.

Figure 5:
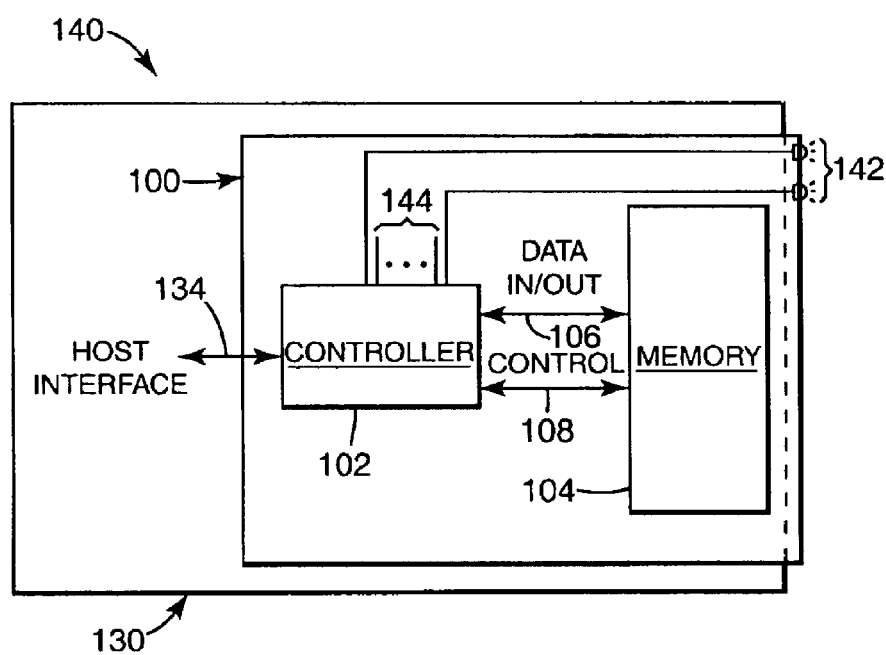
FIG. 5 is a block diagram illustrating another exemplary embodiment of a form factor card according to the present invention incorporating a plurality of indicating lights.

As shown at 140 in FIG. 5, which illustrates form factor card 100 in an installed position within host electronic device 130, one embodiment of factor card 100 utilizes a plurality of indicating lights 142 to communicate to a user of host device 130 a plurality of operational statuses of form factor card 100. Indicating lights 142 comprise a plurality of colors with each representing a particular status of form factor card 100. Controller 102 controls the on/off status of indicating lights 142 independently via a plurality of lines 144.

In one embodiment, controller 102 utilizes the plurality of indicating lights 142 to communicate to a user of host electronic device 130 the statuses described above, including whether card 100 is properly installed, whether there is activity on the data channels 106, whether memory device 104 is nearing or has reached its maximum capacity. When card 100 is properly installed within host electronic device 130, controller 102 turns on and continuously illuminates a green LED. When controller 102 senses activity on data lines 106, controller 102 flashes a red LED on and off to warn the user that card 100 should not be removed. When memory device 104 is nearing capacity, controller 100 flashes a yellow LED on and off and turns the yellow LED on continuously when memory device 104 has reached maximum capacity.

Figure 6:
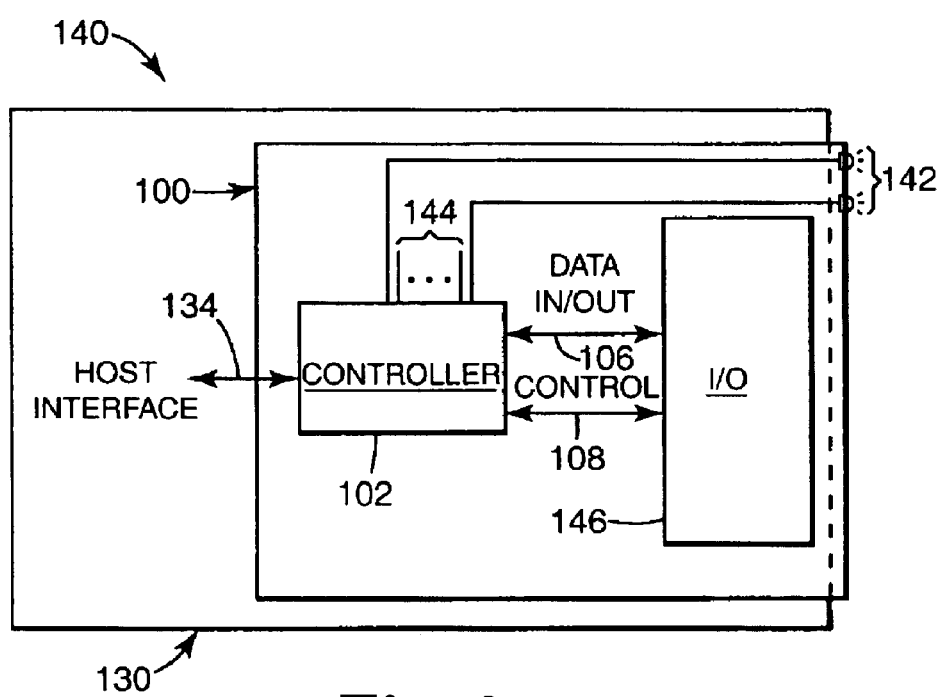
FIG. 6 is a block diagram illustrating another exemplary embodiment of a form factor card according to the present invention.

Form factor card 100 is not limited to use as a memory device. As shown by block diagram in FIG. 6, which illustrates form factor card 100 installed within host device

130, form factor card 100 is also utilized as an I/O device 146. I/O device 146 has a plurality of embodiment including, but not limited to, serial cards, Ethernet cards, fax/modem cards, and wireless pagers. When utilized as an I/O device, as when utilized as a memory device, form factor card 100 is capable of communicating myriad statuses of form factor card 100 to a user of host electronic device 130 via a plurality of indicating lights 142 and lines 144.

In one embodiment, form factor card 100 illuminates a green indicating light to communicate to a user that card 100 is properly installed within host electronic device 130 and is ready for operation. In one embodiment, controller 102 monitors data lines 106 and control lines 108, and flashes a green indicating light on and off to communicate to a user that the I/O device 146 is transmitting/receiving data and should not be removed from host device 130. In one embodiment, controller 102 flashes a red indicating light on and off to communicate to a user that an error has occurred within I/O device 146 or form factor card 100.

In summary, a form factor card according to the present invention reduces the potential for losing and/or corrupting data and files by indicating a status, or statuses, of the form factor card to a user of a host electronic device employing the form factor card. For instance, an indicating light informing the user that the form factor card is currently being accessed by the host electronic device reduces that likelihood that the user will inadvertently remove the card while such operations are taking place, thereby avoiding damage to data or having an application "hang." As another example, in the case of a form factor card being used as a memory card in a digital camera, an indicating light informing the user that the card has reached its storage capacity could potentially avoid the loss of a once in a lifetime photograph by allowing the user to install a "fresh" memory card in a timely fashion. Furthermore, by allowing the user to selectively disable the indicating means, the user can extend the operational time of a battery-powered host device.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the chemical, mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A form factor card compatible for use with a host electronic device, the form factor card comprising:
   an adapter region for interfacing the card with the host electronic device;
   an on-card electronic device for performing a task for the host electronic device, wherein the on-card electronic device includes a data storage device and transfers data between the data storage device and the host device;
   an on-card intelligent controller; and
   an indicator in communication with the on-card intelligent controller to communicate an operational status of the data storage device of the form factor card, including available storage capacity of the data storage device.

2. The form factor card of claim 1, wherein the indicator is a visual indicator and includes an indicating light having an on and off status controlled by the on-card intelligent controller.

3. The form factor card of claim 2, wherein a plurality of indicating lights are controlled by the on-card intelligent controller to communicate a plurality of operational statuses of the card.

4. The form factor card of claim 3, wherein the plurality of indicating lights are a plurality of colors.

5. The form factor card of claim 2, wherein the on-card intelligent controller controls the indicating light on and off status for a finite time period to thereby reduce power consumption.

6. The form factor card of claim 2, wherein the on-card intelligent controller controls the indicating light on and off status to indicate that the on-card electronic device is communicating with the host electronic device.

7. The form factor card of claim 2, wherein the on-card controller controls the indicating light on and off status to indicate that the on-card electronic device is in a failure mode.

8. The form factor card of claim 2, wherein the on-card intelligent controller controls the indicating light on and off status to indicate that the card is properly interfaced with the host electronic device.

9. A memory card compatible for use with a host electronic device, the memory card comprising:
   an adapter region for mechanically and electrically interfacing with the host electronic device;
   a data storage device having a plurality of memory units and configured to transfer data between the memory units and host electronic device;
   an on-card intelligent controller; and
   an indicating light viewable by a host electronic device user, wherein the on-card intelligent controller controls the indicating light on or off status to thereby communicate to the user an operational status of the data storage device of the memory card, including available storage capacity of the data storage device.

10. The memory card of claim 9, wherein a plurality of indicating lights are controlled by the on-card intelligent controller to thereby communicate to the user a plurality of operational statuses of the memory card.

11. The memory card of claim 9, wherein the indicating light is a light emitting diode.

12. The memory card of claim 9, wherein the on-card intelligent controller controls the indicating light on and off status for a finite time period to thereby reduce power consumption.

13. The memory card of claim 9, comprising another indicating light, wherein the on-card intelligent controller controls the another indicating light on and off status to indicate that the host electronic device is communicating with the memory card.

14. The memory card of claim 9, wherein the on-card intelligent controller controls the indicating light on and off status to indicate that the memory card is properly interfaced with the host device.

15. The memory card of claim 9, wherein the on-card intelligent controller controls the indicating light on and off status to indicate that the data storage device is reaching full capacity.

16. The memory card of claim 9, wherein the on-card intelligent controller controls the indicating light on and off status to indicate that the data storage device has reached full capacity.

17. The memory card of claim 10, wherein the plurality of indicating lights are a plurality of colors.

18. A method of operating a form factor card, the method comprising:

monitoring a status of a data storage device of the form factor card; and controlling an indicator light on the form factor card communicating monitored status of the data storage device of the form factor card to user, including available storage capacity of the data storage device.

19. A memory card for use with a host electronic device, the memory card comprising:

a data storage device having a plurality of memory units and configured to transfer data between the memory units and the host electronic device;

a plurality of indicating lights, each having an on/off status; and an on-card intelligent controller configured to control the on/off status of a first indicating light on and off to indicate available storage capacity of the data storage device, including that the data storage device is at or nearing a full storage capacity and, of a second indicating light to indicate to indicate when the data storage device is transferring data between the memory units and the host electronic device.

20. The memory card of claim 19, further comprising a third indicating light to indicate that the memory card is properly interfaced with a host electronic device.

* * * * *

UNITED STATES PATENT AND TRADEMARK OFFICE
CERTIFICATE OF CORRECTION

PATENT NO. : 6,762,930 B2
DATED : July 13, 2004
INVENTOR(S) : Mark Minne

It is certified that error appears in the above-identified patent and that said Letters Patent is hereby corrected as shown below:

Column 7,
Line 9, after "card to" insert -- a --.

Column 8,
Line 8, after "to indicate" delete "to indicate".

Signed and Sealed this

Thirtieth Day of November, 2004

JON W. DUDAS
*Director of the United States Patent and Trademark Office*